United States Patent [19]
Ui

[11] Patent Number: 5,413,188
[45] Date of Patent: May 9, 1995

[54] OPERATOR CABIN OF BULLDOZER

[75] Inventor: Kunio Ui, Komatsu, Japan

[73] Assignee: Kabushiki Kaisha Komatsu Seisakusho, Tokyo, Japan

[21] Appl. No.: 211,848

[22] PCT Filed: Oct. 19, 1992

[86] PCT No.: PCT/JP92/01357
§ 371 Date: May 26, 1994
§ 102(e) Date: May 26, 1994

[87] PCT Pub. No.: WO93/08338
PCT Pub. Date: Apr. 29, 1993

[30] Foreign Application Priority Data

Oct. 18, 1991 [JP] Japan .................. 3-297640
Feb. 7, 1992 [JP] Japan .................. 4-013206
Feb. 7, 1992 [JP] Japan .................. 4-056979

[51] Int. Cl.⁶ .................... B62D 33/06; E02F 9/16
[52] U.S. Cl. .................... 180/89.12; 296/190
[58] Field of Search .............. 180/89.12; 296/190

[56] References Cited

U.S. PATENT DOCUMENTS 3,802,530 4/1974 Purcell et al. .................. 180/89.12
4,206,825 6/1980 van der Lely .................. 180/89.12

FOREIGN PATENT DOCUMENTS 58-94755 6/1983 Japan .
3-2813 1/1991 Japan .
3-239679 10/1991 Japan .

*Primary Examiner*—Kenneth R. Rice
*Attorney, Agent, or Firm*—Richards, Medlock & Andrews

[57] ABSTRACT

An operator cabin of a bulldozer is formed in a shape of truncated hexagonal pyramid having right and left supporting pillars at the utmost front side which slant forwardly from the top part to an intermediate part of the operator cabin and slant rearwardly from the intermediate part to the bottom part of the operator cabin while expanding so as to progressively widen the distance between the supporting pillars to expand a forward field of view from the operator cabin of the bulldozer to the front equipment, such as a blade, and substantially improve the visibility from the eye point of the operator to the front working equipment even during work at night.

15 Claims, 9 Drawing Sheets

OPERATOR CABIN OF BULLDOZER

BACKGROUND OF THE INVENTION

1. Field of the Invention

The present invention relates to an operator cabin of a bulldozer, more particularly, an operator cabin of a bulldozer which is designed to provide improved visibility to its front working equipment, such as both end parts of a blade, and also the visibility at night by facilitating installation of work lamps.

2. Related Background Art

A commonly used operator cabin 51 is formed in a shape of truncated hexagonal pyramid, which is made up by a trapezoidal front part and a rectangular rear part as viewed from above as shown in FIG. 10, and has a front face 52 which is formed to be slantwise in its vertical direction with a fixed width. Accordingly, front side supporting pillars 53 are made to be straight. However, a bulldozer provided with an engine at the front side is disadvantageous in that, since the positions of the front side supporting pillars 53 of the operator cabin 51 are determined in view of the engine space, the visibility of right and left-side parts of the front equipment to the operator is obstructed by these front side supporting pillars 53. Therefore the operator has to incline his body to obtain visibility of the front working equipment while avoiding obstruction by the supporting pillars 53. The construction of the operator cabin 1, as illustrated in FIG. 11, is basically formed with a roof panel 72, side panels 73 and lower base frames. Lifting hooks 74 for lifting the operator cabin 71 and lowering it onto a bulldozer are generally welded to the roof panel 72.

For additionally installing a lamp on the roof of the operator cabin 71, lamp brackets 76 and 77, which are shown disassembled, are generally provided separately from the lifting hooks 74 and are installed on the operator cabin 71. However, a bracket retaining block 78 exclusively used for the lamp bracket is required to install the lamp brackets 76 and 77, and therefore the bracket retaining block 78 should be additionally welded to the roof panel 72. This welding work is extremely difficult for the following reasons. A skilled serviceman is required because the operator cabin is made of a thin sheet metal. Finish workmanship is important since the welded part can be seen from outside. Rust may appear on the welded parts. These reasons make it difficult to carry out field welding.

As described above, the operator cabin 71 is basically formed by the roof panel 72, side panels 73 and base frames. For assembling the roof panel 72 and side panels 73, a large-scale assembly jig has been used to ensure dimensional accuracy of the assembly. Lifting hooks for lifting the operator cabin 71 to install it on the bulldozer are welded to the roof panel 72. However, as shown in FIG. 12, the jig is formed as a box type frame 82 which surrounds the operator cabin 81 to hold the panels from the outside, and it is disadvantageous in that the welding service is extremely troublesome because the serviceman has to carry out welding work inside such complicated framework and the costs of such large-scale installation are expensive. In addition, as the operator cabin roof panel 84, to which lifting hooks 83 are welded as shown in FIGS. 13 and 14, is made of a thin sheet metal, there is a problem of defects of the welded parts and of distortion due to a load during a lifting operation with wire ropes 85.

SUMMARY OF THE INVENTION

An object of the present invention is to provide an operator cabin with which the above various problems are to be solved.

To attain the above-described object, a first aspect of the present invention is such that, in an operator cabin which is formed in a truncated hexagonal pyramid, the utmost front right and left supporting pillars slant forwardly from the top to an intermediate part of the operator cabin and also slant rearwardly from the intermediate part to the bottom, with a width which is progressively increased toward the bottom to expand the forward field of view from the eye point of the operator through right and left doors. A second aspect of the present invention is such that, in an operator cabin which is provided with a roof panel and side panels which are integrally assembled by coupling a plurality of reference holes provided in the periphery of the roof panel, which is integrally molded by press work, and the same number of fitting holes provided in the side panels to be aligned with the reference holes by positioning bosses, adjacent positioning bosses are provided with taps, lifting hooks are fitted at desired positions between taps, and each of the lifting hooks is provided with a hole for installing the work lamp and a hole for passing a lifting wire rope. A third aspect of the present invention is such that, in an operator cabin which is formed with a roof panel, side panels and base frames, the roof panel, which is integrally molded by press work, is provided with a plurality of reference holes at its periphery, and the side panels are provided with the same number of fitting holes to be aligned with the reference holes and positioning bosses for coupling the reference holes and the fitting holes, the positioning bosses being respectively provided with taps for installing the lifting hooks.

Since the present invention provides the operator cabin with a construction as described above, the first aspect of the invention eliminates obstruction by the supporting pillars of the viewing of the front working equipment, and therefore improves forward visibility. The second aspect of the invention enables the work lamp to be installed to the lifting hook by using the work lamp fitting hole, and enables the use of the lifting hooks to lift the operator cabin and install the operator cabin onto the bulldozer by using a wire rope passed through the lifting hooks. The third aspect of the invention ensures the dimensional accuracy, by aligning the reference holes of the roof panel with the fitting holes of the side panels and coupling these reference holes and fitting holes with positioning bosses, and enables the lifting hooks to be fitted to the taps on the positioning bosses.

BEST MODES FOR CARRYING OUT THE INVENTION

Embodiments of the present invention are described, referring to FIGS. 1 to 9.

Figure 1:
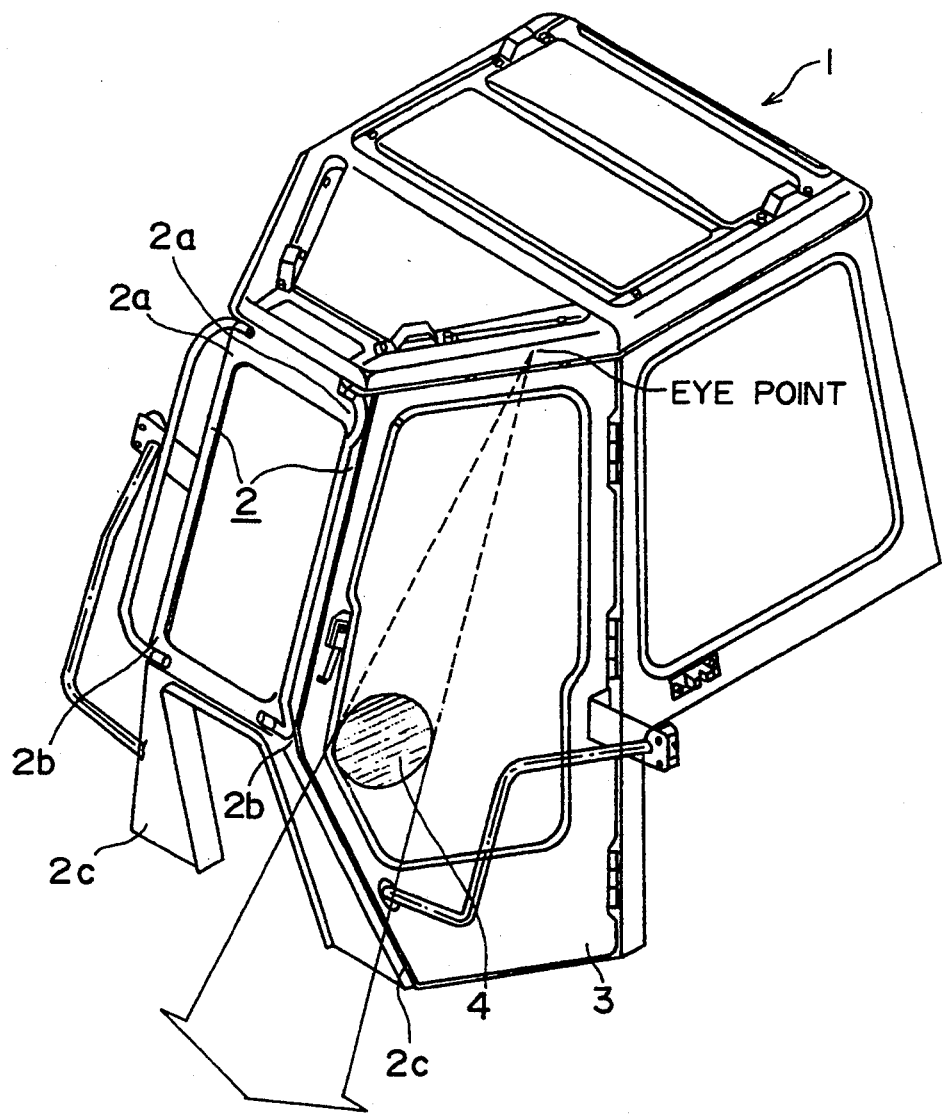
FIG. 1 is a perspective view of a first embodiment of an operator cabin of a bulldozer according to the present invention.
Figure 2:
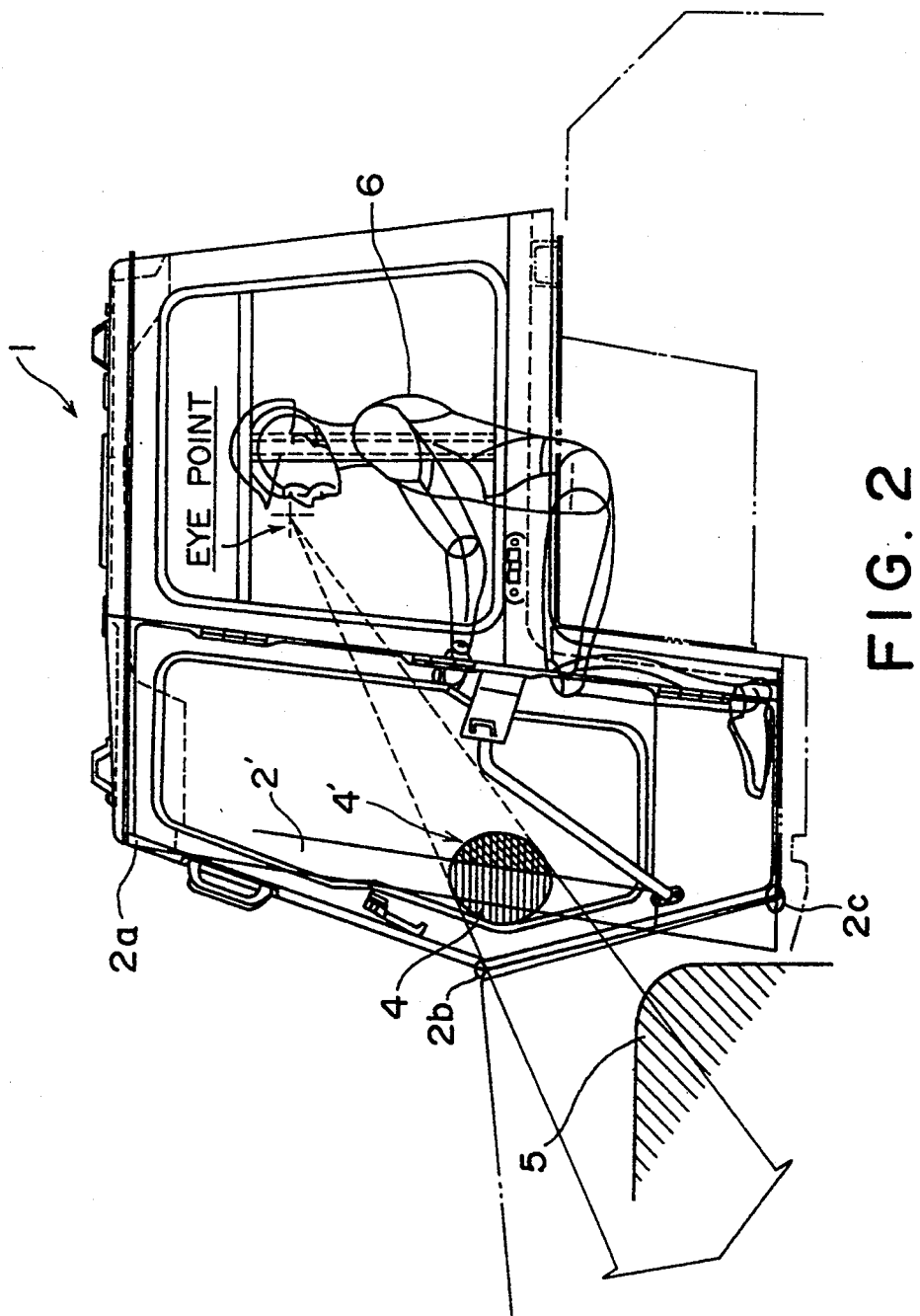
FIG. 2 is a side view of FIG. 1.
Figure 3:
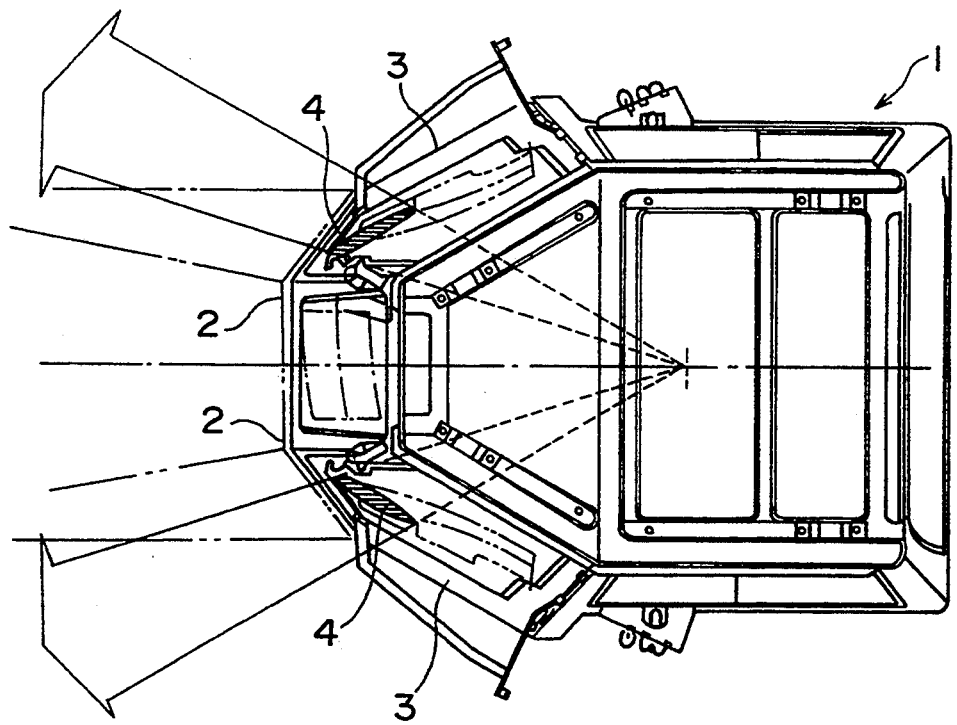
FIG. 3 is a plan view of FIG. 1.
Figure 10:
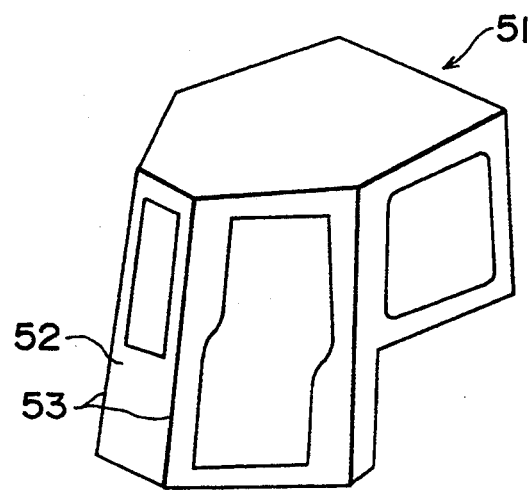
FIG. 10 is a perspective view of the operator cabin of a conventional bulldozer.

FIGS. 1 to 3 show a first embodiment of an operator cabin of a bulldozer according to the invention: FIG. 1 is a perspective view of the operator cabin, FIG. 2 is a side view of FIG. 1, and FIG. 3 is a plan view of FIG. 1.

In the operator cabin 1 according to the present invention which is formed in the shape of truncated hexagonal pyramid, utmost front right and left supporting pillars 2 slant forwardly from an upper part 2a to an intermediate part 2b of the operator cabin and slant rearwardly with a progressively increasing distance between the supporting pillars 2 from the intermediate part 2b to a bottom part 2c, whereby a forward field of view 4 from an eye point of an operator through right and left side doors 3, 3 is expanded.

The operator cabin 1 comprises a front part with the doors 3 and a rear part without the doors 3. Right and left supporting pillars 2 are provided at the utmost front side of the front part extending from the upper part 2a to the bottom part 2c and <-shaped as viewed from the left side and >-shaped as viewed from the right side. The distance between supporting pillars 2 is progressively increased to be greatest at a position close to the lower part of the doors 3 and the bottom part 2c is positioned rearwardly from the intermediate part 2b. Accordingly, the doors 3, as installed, slant outwardly from the upper part to the lower part. Therefore the forward field of view 4 is obtained through the door 3. The lower parts of the supporting pillars 2 are positioned with a clearance from engine 5 to avoid contact with the rear part of the engine 5.

Specifically, although the field of view 4 from the eye point of the operator 6 is limited to only a portion 4' as shown in FIG. 2 in a conventional operator cabin with straight supporting pillars 2', a portion 4 is added to the field of view in the invention to improve the visibility. This enlarged field of view, shown with an outlined arrow in FIG. 1 as a side view and outlined arrows in FIG. 3 as a plan view, allows the operator to directly watch both end parts of the front working equipment from his seat without changing his operating position. As illustrated in FIGS. 1-3, the forward edge of the forward field of view through the front side panels 3 is <-shaped as viewed from the left side of the operator cabin 1 and >-shaped as viewed from the right side of the operator cabin 1, so as to enlarge the forward field of view through the front side panels 3 over that of a conventional operator cabin where, as illustrated in FIG. 2, the utmost front supporting pillars 2' extend straight from the upper part 2a of the operator cabin 1 to the bottom part 2b of the operator cabin 1.

Figure 4:
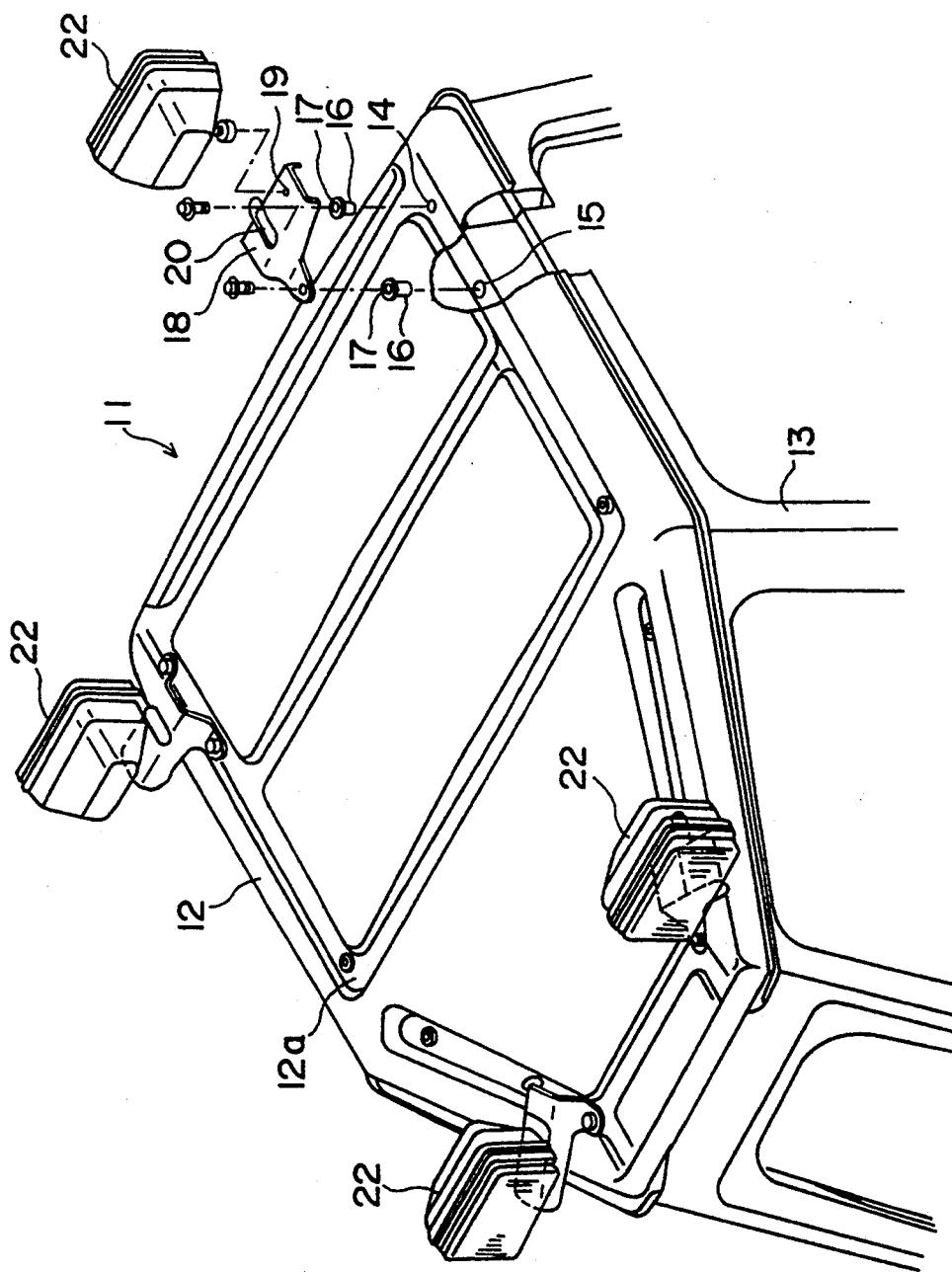
FIG. 4 is a perspective view of a second embodiment of an operator cabin of a bulldozer according to the present invention.
Figure 5:
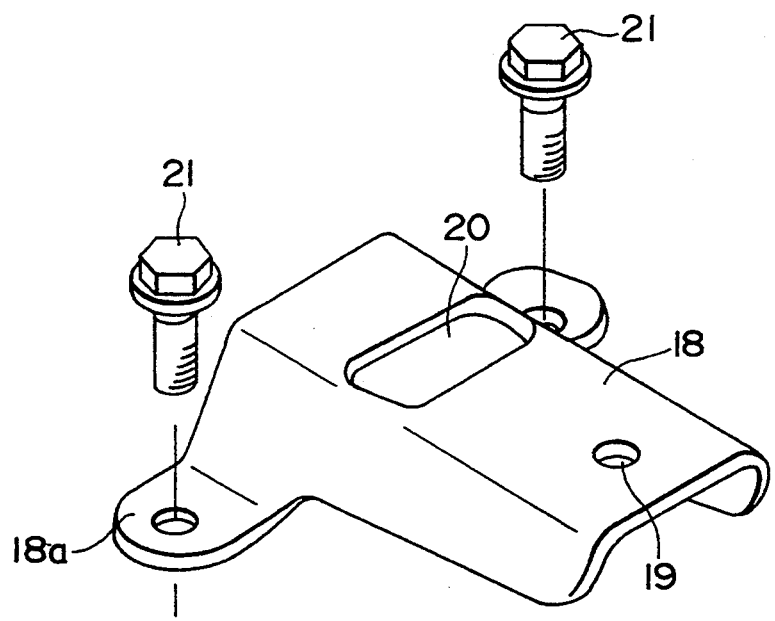
FIG. 5 is an expanded perspective view of a lifting part of FIG. 4.
Figure 6:
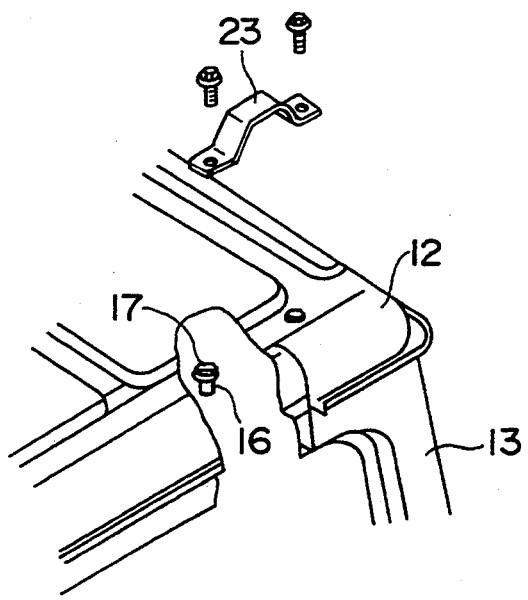
FIG. 6 is a perspective view when the work lamp bracket is not installed.

FIGS. 4 to 6 respectively show a second embodiment of the operator cabin of the bulldozer according to the invention: FIG. 4 is a perspective view of the operator cabin, FIG. 5 is an expanded perspective view of the lifting hook part of FIG. 4, and FIG. 6 is a perspective view when the work lamp bracket is not installed.

The operator cabin 11 is provided with a roof panel 12 and side panels 13. The roof panel 12, which is integrally molded by press work, is assembled with side panels 13 by using positioning bosses 16 to couple a plurality of reference holes 14 provided at the periphery of the roof panel 12 and the same number of fitting holes 15 provided in the side panels so as to be aligned with the reference holes 14. Adjacent positioning bosses 16, 16 are provided with taps 17, 17. A lifting hook 18, which is provided with a work lamp fixing hole 19 and a wire rope hole 20, is fixed at a specified position between these taps 17, 17.

The roof panel 12 is a truncated hexagon comprising a trapezoid with a smaller width at its front side and a rectangle which extends from the rear side of the trapezoid to the rear edge of the roof panel 12. The side panels 13 are fitted to the base frames, not shown, while being slightly slanted with a progressively increasing width toward the lower end, thus forming the operator cabin 11. The reference holes 14 of the roof panel 12 are provided in a groove portion 12a as shown in FIG. 4, and the fitting holes 15 which mate with these reference holes 14 are provided in a part of each side panel 13 which comes in contact with the lower surface of the groove portion 12a. The positioning bosses 16 are made from a bar material to have a stepped shape with a large diameter part and a reduced diameter part. The reduced diameter part is inserted into the reference hole 14 and the fitting hole 15 while the larger diameter part serves as a stopper. The roof panel 12 and the side panels 13 are assembled to form the operator cabin 11 by aligning the reference holes 14 with the fitting holes 15 and then coupling these holes with positioning bosses 16. In this embodiment, the positioning bosses 16 are provided with taps 17, and a lifting hook 18 is installed at a specified position between these taps 17, 17. In this embodiment, a lifting hook 18, which is to be provided at a position with a specified pitch between the taps 17, 17 is provided at each of four positions on the roof of the operator cabin 11: a right front position, a left front position, a right rear position and a left rear position. Each lifting hook 18 has a raised section, and the work lamp fixing hole 19 is provided adjacent a longitudinal end of the raised section while the rectangular wire rope hole 20 is provided at approximately the center of the raised section. Fitting flanges 18a extend from both right and left sides of one end of the raised section to contact the areas around the reference holes 14. When bolts 21 are inserted into the holes provided in these fitting flanges 18a and tightly fitted to the taps 17, the lifting hook 18 is firmly fixed to the operator cabin 11.

For installing a work lamp 22 on a lifting hook 18, the threaded part of the fitting part of the work lamp unit is inserted from above into the work lamp fitting hole 19 and fixed with a fixing means such as a nut on the underside. For using the lifting hook 18 to lift the operator cabin 11, the work lamp 22 is removed in advance and a wire rope, not shown, is passed through the wire rope hole 20 and the operator cabin can be lifted. If the work lamp 22 need not be installed, a lifting hook 23 as shown in FIG. 6 can be provided. However, if it is necessary to additionally install the work lamp, the lifting hook 23 shown in FIG. 6 can be replaced with the lifting hook 18 which also serves as the bracket for the work lamp.

Figure 7:
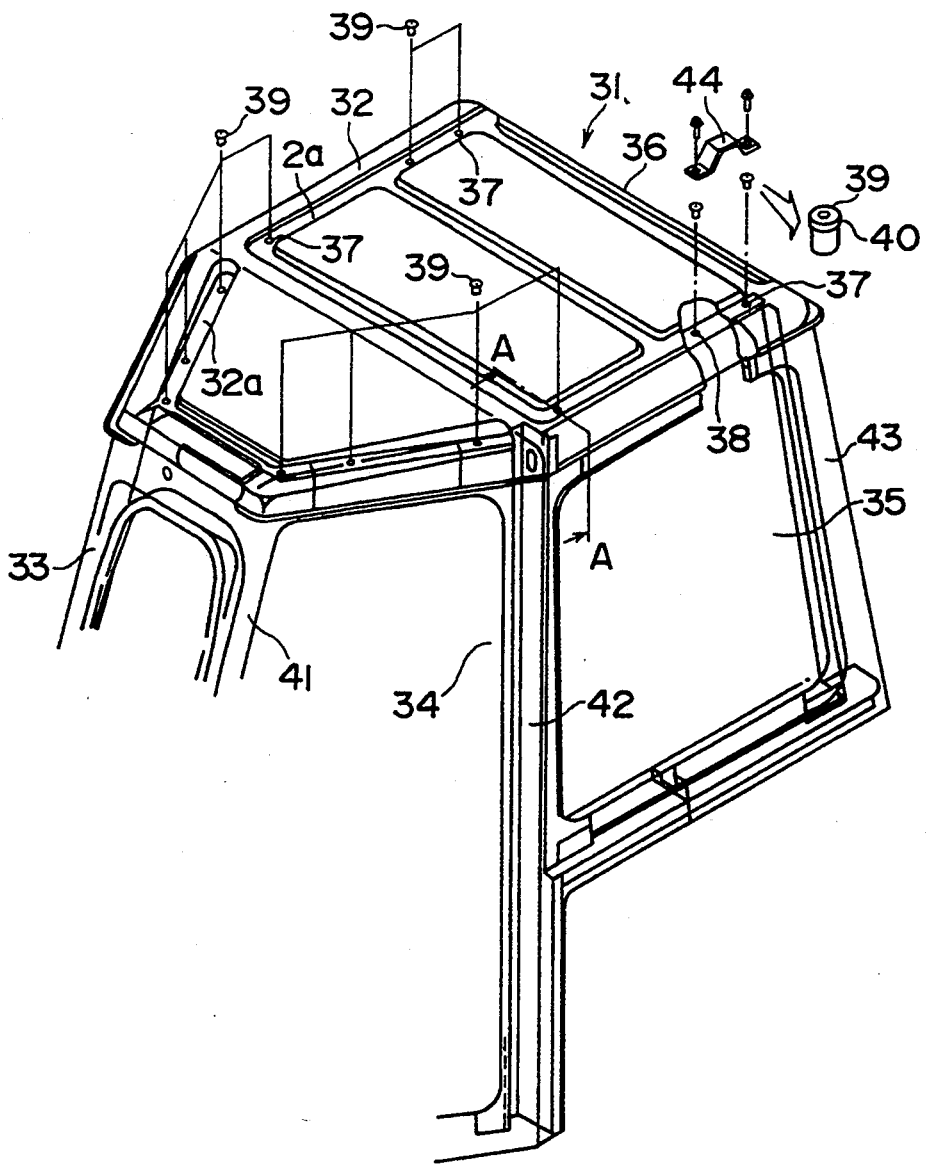
FIG. 7 is a perspective view of a skeleton of an operator cabin according to the invention.
Figure 8:
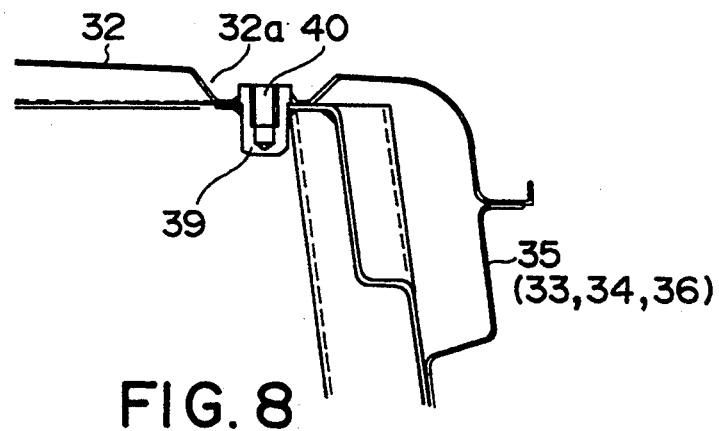
FIG. 8 is an expanded view of section A—A of FIG. 7.
Figure 9:
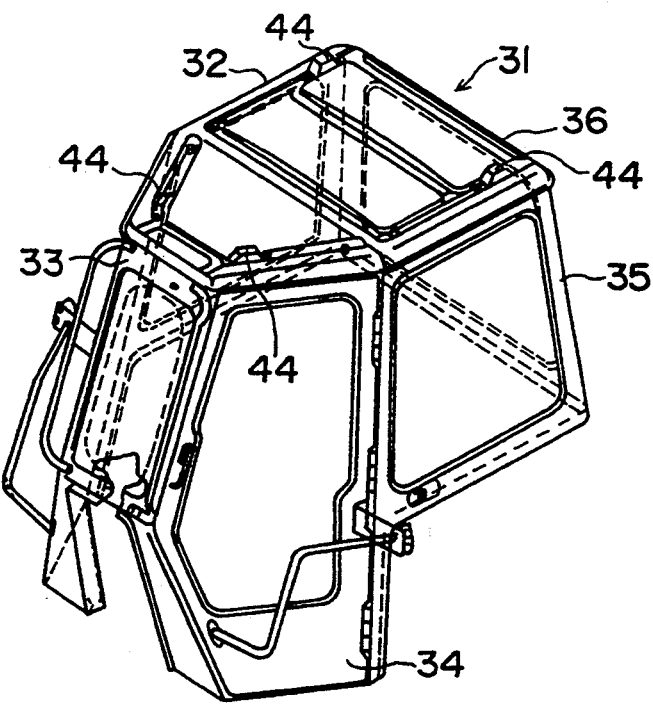
FIG. 9 is a perspective view showing an appearance of the operator cabin including the lifting hooks according to the invention.
Figure 12:
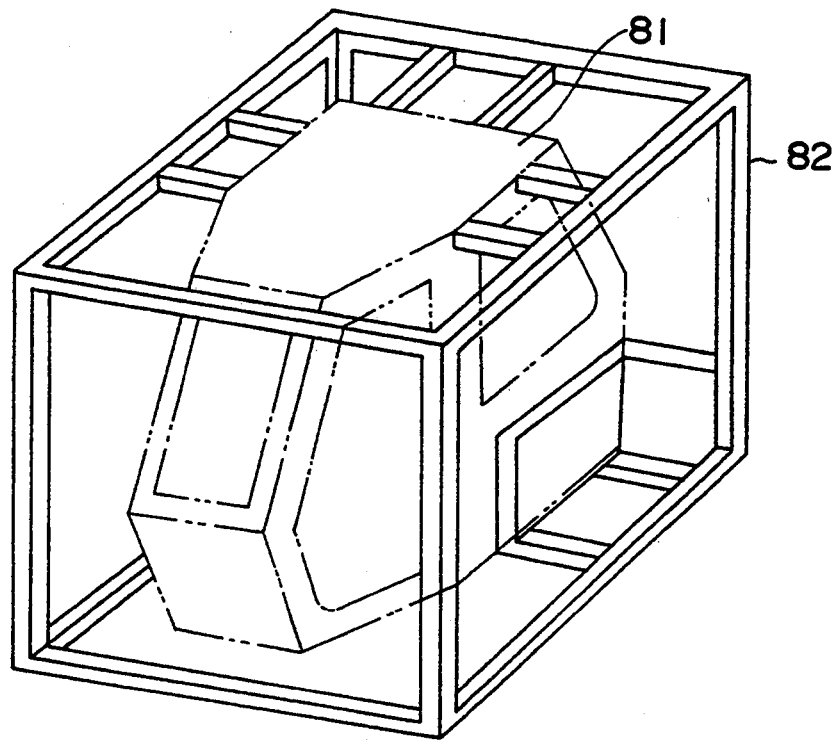
FIG. 12 is an illustration of the jig used for assembly of the conventional operator cabin.
Figure 11:
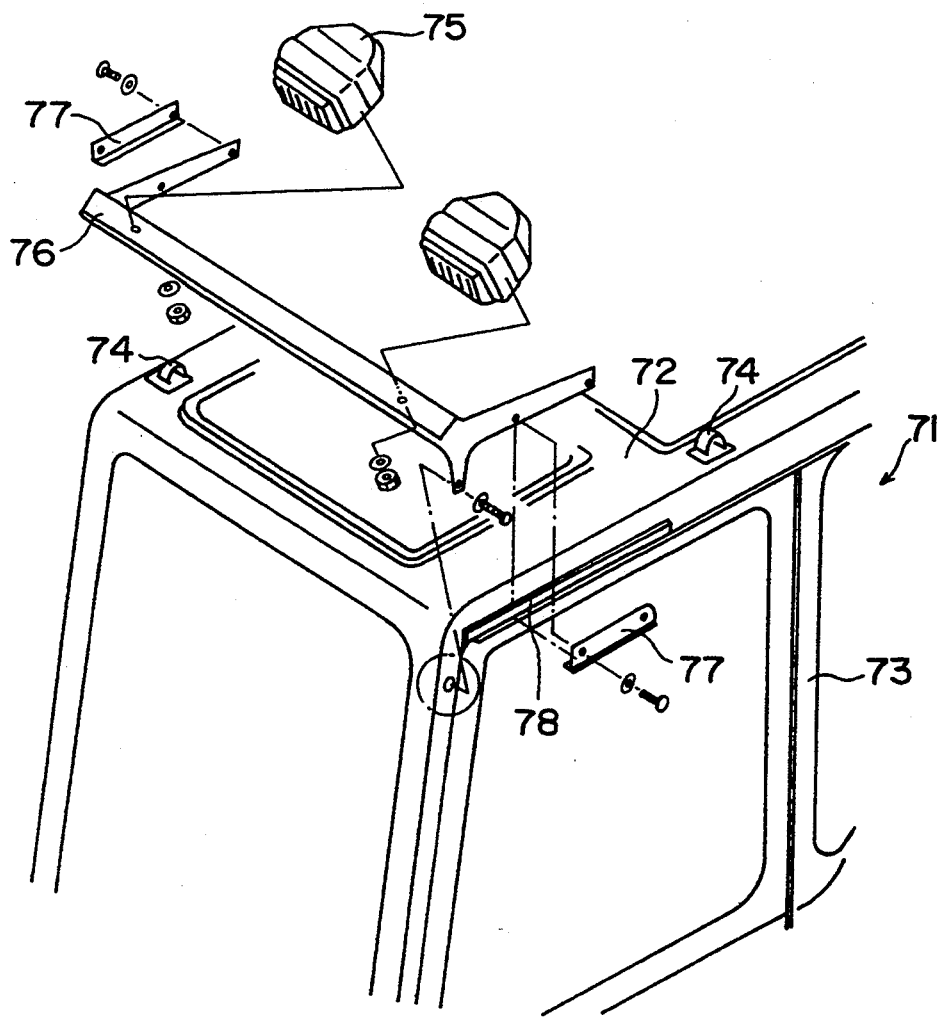
FIG. 11 is a perspective view showing an example of the work lamp bracket installed on the operator cabin.
Figure 13:
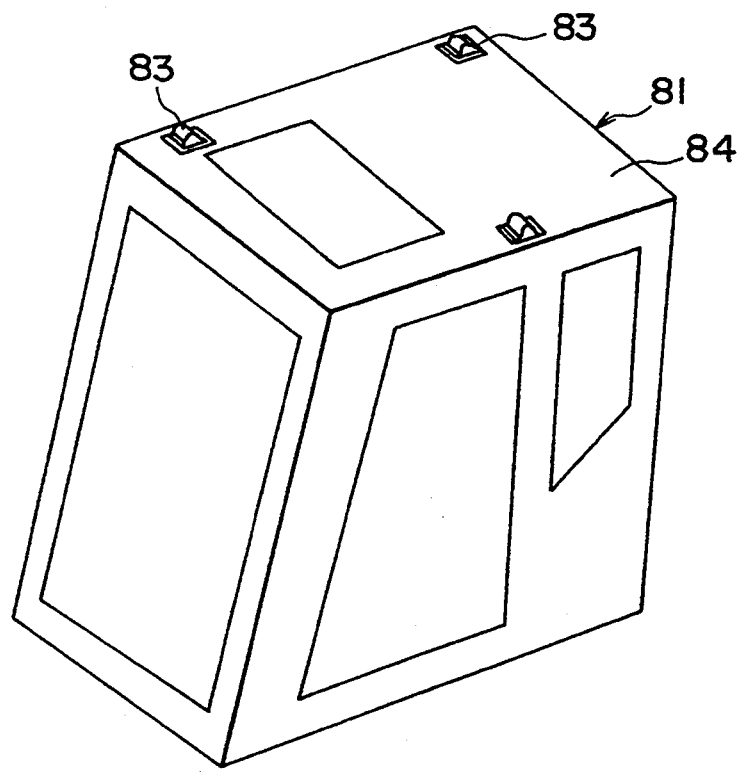
FIG. 13 is a perspective view showing the lifting hooks provided on the conventional operator cabin.
Figure 14:
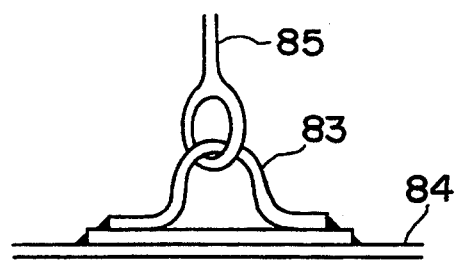
FIG. 14 is a perspective view showing the details of the lifting hooks shown in FIG. 13.

FIGS. 7 to 9 show a third embodiment of an operator cabin of a bulldozer according to the present invention: FIG. 7 is a perspective view of a skeleton of the operator cabin according to the invention, FIG. 8 is an expanded view of the section A-A of FIG. 8, and FIG. 9 is a perspective view showing the appearance of the operator cabin including the lifting hook according to the invention. The operator cabin 31 comprises a roof panel 32, side panels 33, 34, 35 and 36 and base frames, not shown. The roof panel is integrally molded as one unit and is provided with a plurality of reference holes 37, 37, . . . at its periphery. The side panels are provided with the same number of fitting holes 38, 38, . . . which mate with the reference holes 37, and positioning bosses 39, 39, . . . are provided in the reference holes 37 and the fitting holes 38 of the side panels, each of the positioning bosses 39 being provided with a tap.

The roof panel 32 is a truncated hexagon comprising a trapezoid with a smaller width at its front side and a rectangle which extends from the rear side of the trapezoid to the rear edge of the roof panel. The side panels 33, 34, 35 and 36 are fitted to the base frames, not shown, while being slightly inclined with a progressively increasing width toward the lower end, thus forming the operator cabin 31. Specifically, the side panel 33 is provided as a front face panel, side panels 34, 34 are provided at opposite sides of the front face panel 33, side panels 35, 35 are provided following the side panels 34, and the side panel 36 is provided as a rear panel connected to the rear sides of the side panels 35. Frame members, such as internal front pillars 41, center pillars 42 and rear pillars 43, are provided at all connecting positions of the side panels as shown, and the side panels 33, 34, 35 and 36 are arranged to cover these supporting pillars. The reference holes 37 in the roof panel 32 are formed in groove portion 32a as shown in FIGS. 7 and 8. The fitting holes 38 are provided in the parts of the side panels 33, 34, 35 which come in contact with the lower surface of the groove portion 32a. The upper peripheries of side panels 33, 34, 35, and 36 are kept in contact with the periphery of the roof panel 32, as shown in FIG. 8 and isolated from the outside. Positioning bosses 39 are made as stepped stub rods, each having larger and smaller diameters. The smaller diameter part is inserted into the reference hole 37 and the fitting hole 38 while the and a larger diameter part serves as a stopper.

The following describes an assembly of the roof panel 32 and side panels 33, 34, 35 and 36. For assembling the side panels 33, 34, 35 and 36 and fitting the roof panel 32 to the assembly of side panels, the fitting holes 38 of side panels 33, 34, and 35 are aligned with the reference holes 37, and positioning bosses 39 are inserted through respective reference holes 37 and aligned fitting holes 38 whereby the roof panel and the side panels are positioned. The positioning bosses 39 are welded to the roof panel 32 and the side panels 33, 34, 35 and 36 to form an integrated assembly. A tap 40 is provided in each of positioning bosses 39 and a lifting hook 44 can be fitted by using the taps as shown in FIG. 7.

In this embodiment, an example of a lifting hook 44 fitted to the taps 40 has been described. Moreover, such items as, for example, an additional lamp, a guard for protection from dropping objects, etc. can be attached.

Industrial Applicability

When the operator cabin according to the present invention is applied to a bulldozer, the visibility to the front working equipment, such as both ends of the blade, can be improved and forward illumination is possible since work lamps can be installed. In addition, the operator cabin can be constructed without using a large-scale assembly jig.

What is claimed is:

1. An operator cabin, suitable for use on a bulldozer, said operator cabin being formed in the shape of a truncated hexagonal pyramid having a hexagonal roof panel, a front panel, two front side panels, two rear side panels and a rear panel, wherein said front panel is secured between right and left utmost front supporting pillars and each of said front side panels extends rearwardly from a respective one of said utmost front supporting pillars, wherein said right and left utmost front supporting pillars slant forwardly from an upper part of the operator cabin to an intermediate part of the operator cabin and then slant rearwardly from said intermediate part to a bottom part of the operator cabin with a progressively increasing width between said supporting pillars so as to expand a forward field of view through said front side panels from an eye point of an operator in the operator cabin in comparison to a forward field of view through said front side panels from said eye point if said utmost front supporting pillars were to extend straight from said upper part of the operator cabin to said bottom part of the operator cabin.

2. An operator cabin in accordance with claim 1, wherein at least one of said front side panels comprises a door.

3. An operator cabin in accordance with claim 1, wherein the front side panels slant from a top part of the operator cabin outwardly toward a bottom part of the operator cabin with a progressively increasing width toward the bottom part.

4. An operator cabin in accordance with claim 1, wherein the forward edge of the forward field of view through said front side panels is <-shaped as viewed from the left side of operator cabin and >-shaped as viewed from the right side of the operator cabin.

5. An operator cabin in accordance with claim 4, wherein the front side panels slant from a top part of the operator cabin outwardly toward a bottom part of the operator cabin with a progressively increasing width toward the bottom part.

6. An operator cabin in accordance with claim 5, wherein at least one of said front side panels comprises a door.

7. An operator cabin in accordance with claim 6, wherein said roof panel is integrally press molded and has a plurality of reference holes provided on a periphery of said roof panel, wherein said rear side panels have fitting holes which are aligned with reference holes in the roof panel, and wherein positioning bosses are provided in the thus aligned fitting and reference holes to secure the roof panel to the rear side panels.

8. An operator cabin in accordance with claim 7, wherein each of a pair of adjacent positioning bosses has taps, and further comprising a lifting hook secured to said taps.

9. An operator cabin in accordance with claim 8, wherein said lifting hook has a work lamp fitting hole and a wire rope hole.

10. An operator cabin in accordance with claim 9, further comprising a work lamp mounted in the work lamp fitting hole of the lifting hook.

11. An operator cabin in accordance with claim 1, wherein said roof panel is integrally press molded and has a plurality of reference holes provided on a periphery of said roof panel, wherein said rear side panels have fitting holes which are aligned with reference holes in the roof panel, and wherein positioning bosses are provided in the thus aligned fitting and reference holes to secure the roof panel to the rear side panels.

12. An operator cabin in accordance with claim 11, wherein each of a pair of adjacent positioning bosses has taps, and further comprising a lifting hook secured to said taps.

13. An operator cabin in accordance with claim 12, wherein said lifting hook has a work lamp fitting hole and a wire rope hole.

14. An operator cabin in accordance with claim 13, further comprising a work lamp mounted in the work lamp fitting hole of the lifting hook.

15. An operator cabin, suitable for use on a bulldozer, said operator cabin comprising a roof panel, side panels, and positioning bosses, wherein said roof panel is integrally press molded and has a plurality of reference holes on its periphery, wherein said side panels have fitting holes aligned with said reference holes, and wherein each of said positioning bosses extends through one of said reference holes and an aligned fitting hole and is welded to said roof panel and the respective side panel for coupling the respective side panel to said roof panel.

* * * * *